(12) United States Patent
Kwak et al.

(10) Patent No.: US 6,891,579 B2
(45) Date of Patent: May 10, 2005

(54) LIQUID CRYSTAL DISPLAY PANEL AND METHOD FOR MANUFACTURING THE SAME

(75) Inventors: Dong Yeung Kwak, Daegukwangyeok-shi (KR); Ki Tae Kim, Daegukwangyeok-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/026,515

(22) Filed: Dec. 27, 2001

(65) Prior Publication Data

US 2002/0089626 A1 Jul. 11, 2002

(30) Foreign Application Priority Data

Dec. 27, 2000 (KR) ...................................... P2000-83064

(51) Int. Cl.$^7$ ........................ G02F 1/136; G02F 1/1343; G02F 1/1335; G09G 3/19; H01L 29/04
(52) U.S. Cl. ........................ 349/44; 349/39; 349/113; 345/92; 257/72
(58) Field of Search ........................ 349/44, 39, 113; 345/92; 257/72

(56) References Cited

U.S. PATENT DOCUMENTS 5,734,455 A * 3/1998 Yoshida et al. ............... 349/99
RE37,591 E * 3/2002 Shimada et al. .............. 349/39

* cited by examiner

Primary Examiner—Tarifur R. Chowdhury
Assistant Examiner—Hoan Chau Nguyen
(74) Attorney, Agent, or Firm—Birch, Stewart, Kolasch & Birch, LLP

(57) ABSTRACT

An LCD panel and a method for manufacturing the same is disclosed, in which light leakage is prevented from occurring by forming a dummy pattern in an array peripheral region. The LCD panel includes a first substrate having an array region and an array peripheral region, a gate line on the first substrate, a gate insulating film on the entire surface of the first substrate including the gate line, a data line arranged to cross the gate line for defining a pixel region on the array region, a light leakage prevention film formed between the gate and/or data lines of the array peripheral region for preventing light leakage in the panel, and a TFT and a pixel electrode formed in each pixel region.

14 Claims, 6 Drawing Sheets

LIQUID CRYSTAL DISPLAY PANEL AND METHOD FOR MANUFACTURING THE SAME

RELATED APPLICATION

The present application claims the benefit of Korean Patent Application No. P2000-083064 filed Dec. 27, 2000, which is herein fully incorporated by reference.

BACKGROUND OF THE INVENTION

1. Field of the Invention

The present invention relates to a liquid crystal display (LCD) device, and more particularly, to an LCD panel and a method for manufacturing the same in which light leakage is prevented from occurring in an array peripheral region, thereby improving picture quality.

2. Background of the Related Art

Recently, an LCD device, one of flat panel devices, has received much attention. The LCD device changes an optical anisotropy by applying an electric field to a liquid crystal having liquidity of a liquid and optical characteristic of a crystal. The LCD device can achieve miniaturization, high resolution, large sizing, and lower power consumption compared with related art cathode ray tubes (CRTs).

The LCD panel of the LCD device generally includes a first substrate, a second substrate attached to the first substrate to oppose the first substrate, and a liquid crystal layer between the first and second substrates. If the first and second substrates are not aligned precisely with respect to each other, doted images are generated at undesired portions of the panel due to light leakage.

To prevent light leakage from occurring in the panel, a black matrix is formed in at portions where a major light leakage occurs. However, there are limitations to prevent completely any light leakage from occurring in the LCD panels which is discussed below in more detail.

A related art LCD panel and a method for manufacturing the same will be described in the accompanying drawings.

A related art LCD panel includes an array region, an array peripheral region, and a pad region. These regions are well known in the art. The array region is an active region to drive the liquid crystal. In the array peripheral region, lines such as gate lines or data lines for transmitting signals are linked to each other. These linked lines are then connected with an external driving circuit in the pad region of the LCD panel.

FIG. 1 is a sectional view of a related art LCD panel. FIG. 2 is a sectional view of the LCD panel taken along line I–I' of FIG. 1 to describe certain problems of the related art LCD panel.

Referring to FIG. 1 and FIG. 2, the related art LCD panel will be described in detail.

The related art LCD panel includes first and second substrates 10 and 20, and a liquid crystal layer 16.

In the first substrate 10, a plurality of gate lines 11 are formed at certain constant intervals, and a gate insulating film 12 is formed on the entire surface of the first substrate including the gate lines 11. A plurality of data lines 13 are formed at certain constant intervals on the gate insulating film 12 to cross the gate lines 11 in a matrix form, thereby defining a pixel region. Then, a capacitor metal layer 13a is formed simultaneously with each of the data lines 13 in a predetermined portion of each gate line 11 to provide a capacitor with the gate line 11. For each pixel area of the pixel region, a thin film transistor (TFT) is formed at a crossing point of the corresponding gate line 11 and the corresponding data line 13. Then, a passivation film 14 is formed on the entire surface of the first substrate including the TFT. A pixel electrode 15 electrically connected with the TFT is formed on the passivation film 14 at each pixel area of the pixel region.

The second substrate includes a color filter layer 18, a black matrix 19, and a common electrode 17. The color filter layer 18 is formed on the second substrate 20 to display color. Then the black matrix 19 is formed between the color filter layers 18 to prevent light from leaking. In the common electrode 17, an electric field is formed to drive the liquid crystal using the pixel electrode 15.

At this time, the gate lines 11 and the data lines 13 are respectively extended to a gate pad region and a data pad region of the pad region, and are connected with the external driving circuit.

Such an LCD panel includes a back light at the rear of the panel. When light from the back light passes through the panel, light leakage occurs at undesired portions, so that the display panel is partially dotted.

To solve the light leakage problem in the display panel, the edge of the pixel electrode is overlapped with the gate lines, or the black matrix 19 is additionally formed at portions where a significant light leakage occurs. However, as shown in FIG. 1, if the first and second substrates are not aligned precisely to each other, light leakage occurs at portions where the black matrix is not formed.

Furthermore, if a pattern of the liquid crystal is shifted or a disclination occurs during the formation of the liquid crystal pattern, a distortion in the liquid crystal occurs. At this time, light from the back light passes through the portions of the panel where the black matrix is not formed, thereby generating a device and operation defect.

Moreover, light leakage often occurs in the array peripheral region that generally corresponds to the four corners of the panel due to refractive characteristics of the light.

SUMMARY OF THE INVENTION

Accordingly, the present invention is directed to an LCD panel and a method for fabrication the same that substantially obviates one or more problems due to limitations and disadvantages of the related art.

An object of the present invention is to provide an LCD panel and a method for manufacturing the same that have a dummy pattern in an array peripheral region, so that occurrence of light leakage is prevented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD panel according to an embodiment of the present invention includes: a first substrate having an array region and an array peripheral region, a gate line on the first substrate, a gate insulating film on the entire surface of the first substrate including the gate line, a data line arranged to cross the gate line for defining a pixel region on the array region, a light leakage prevention film formed between the lines of the array peripheral region for preventing light leakage, and a TFT (thin film transistor) and a pixel electrode formed in each pixel region.

In another aspect of the present invention, a method for manufacturing an LCD panel including a first substrate having an array region and an array peripheral region, includes the steps of forming a gate line by depositing a metal on the first substrate and patterning the metal, forming a gate insulating film on the entire surface of the first substrate including the gate line, forming a data line to cross the gate line for defining a pixel region on the array region, forming a light leakage prevention film between the lines of the array peripheral region to prevent light leakage, forming a TFT at a crossing point of the gate line and the data line, forming a passivation film on the entire surface of the first substrate including the TFT, and forming a pixel electrode connected with the TFT on the passivation film.

That is, in an LCD panel of the present invention, a dummy pattern is additionally formed on an array peripheral region, so that light leakage is prevented from occurring in the array peripheral region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
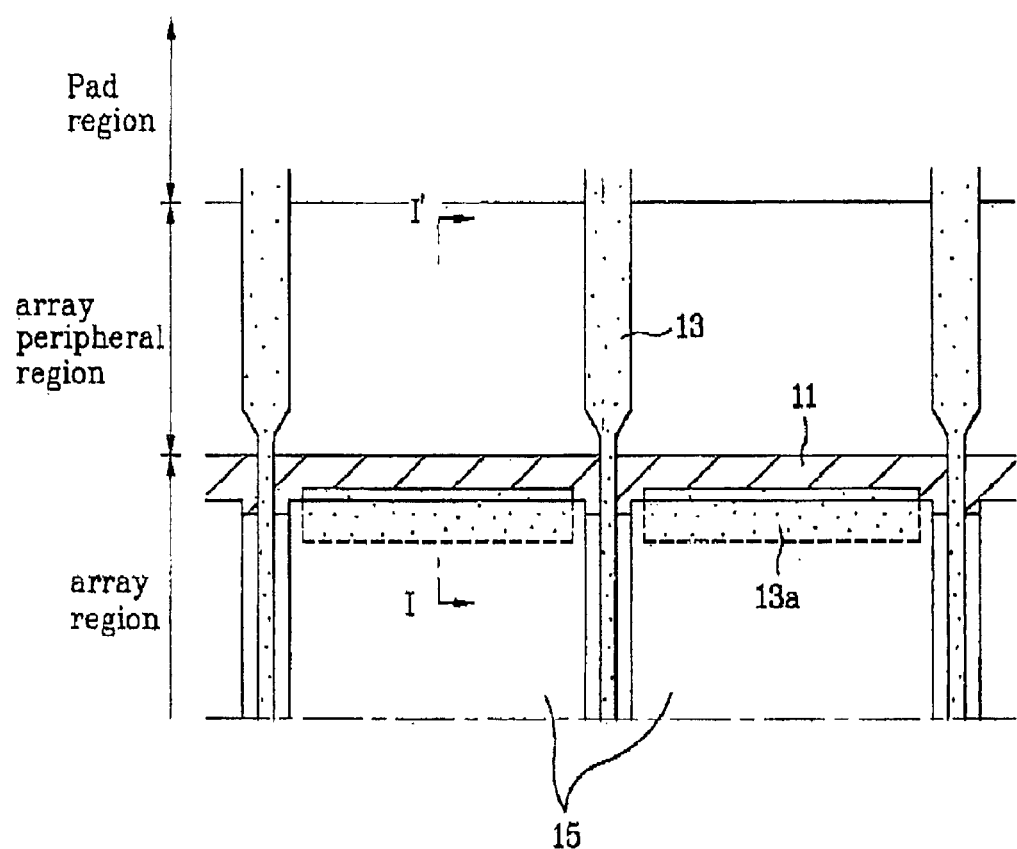
FIG. 1 is a plan view of a related art LCD panel.
Figure 2:
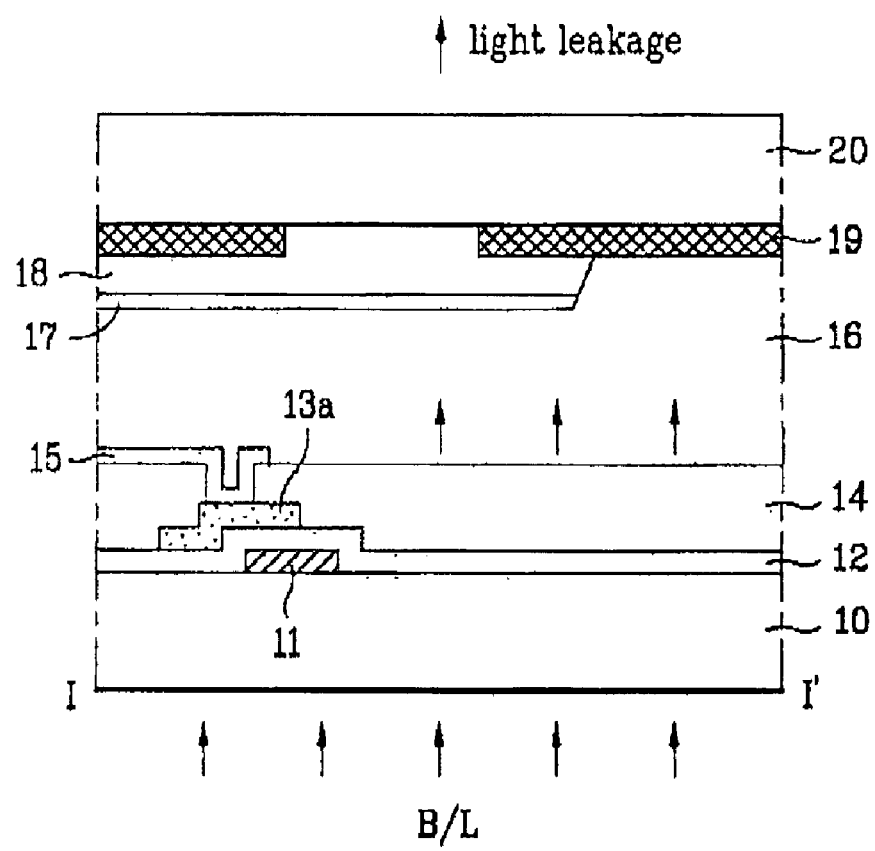
FIG. 2 is a sectional view of the related art LCD panel taken along line I–I' of FIG. 1 to describe problems of the related art LCD panel.
Figure 3:
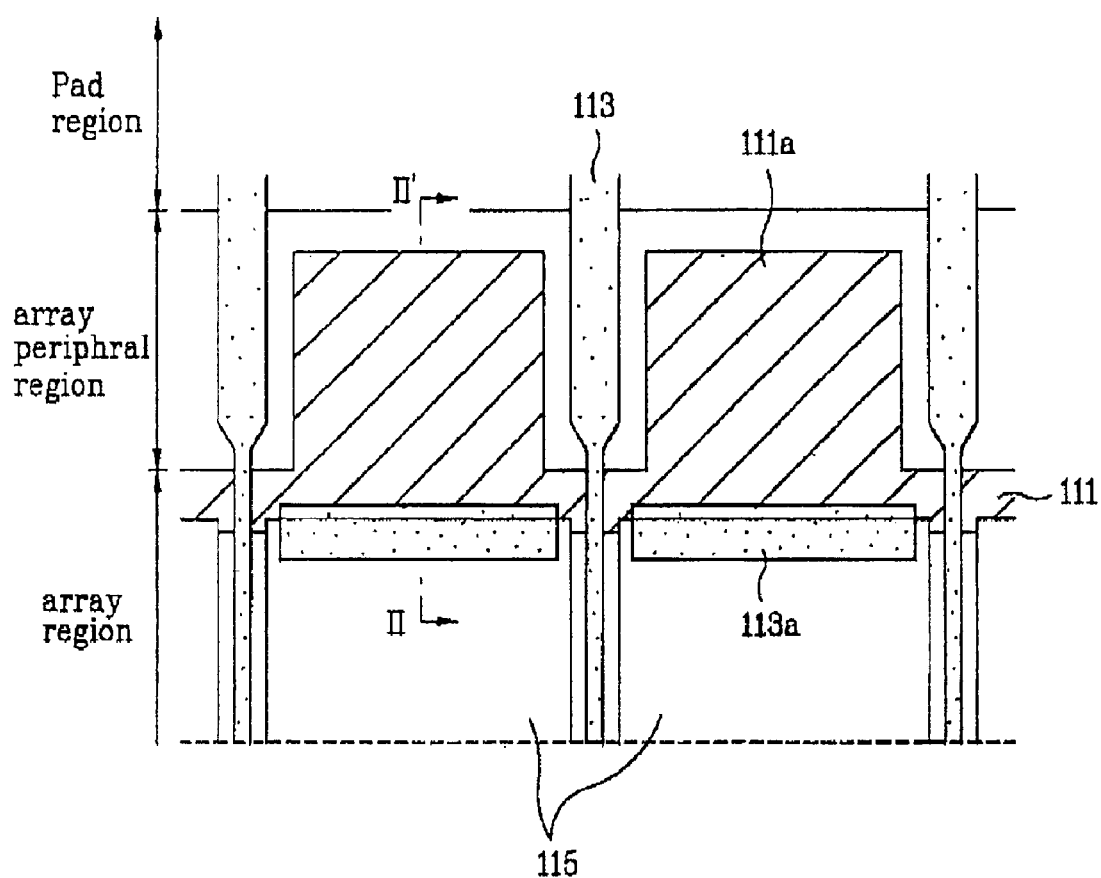
FIG. 3 is a plan view of an LCD panel according to a first embodiment of the present invention.
Figure 4:
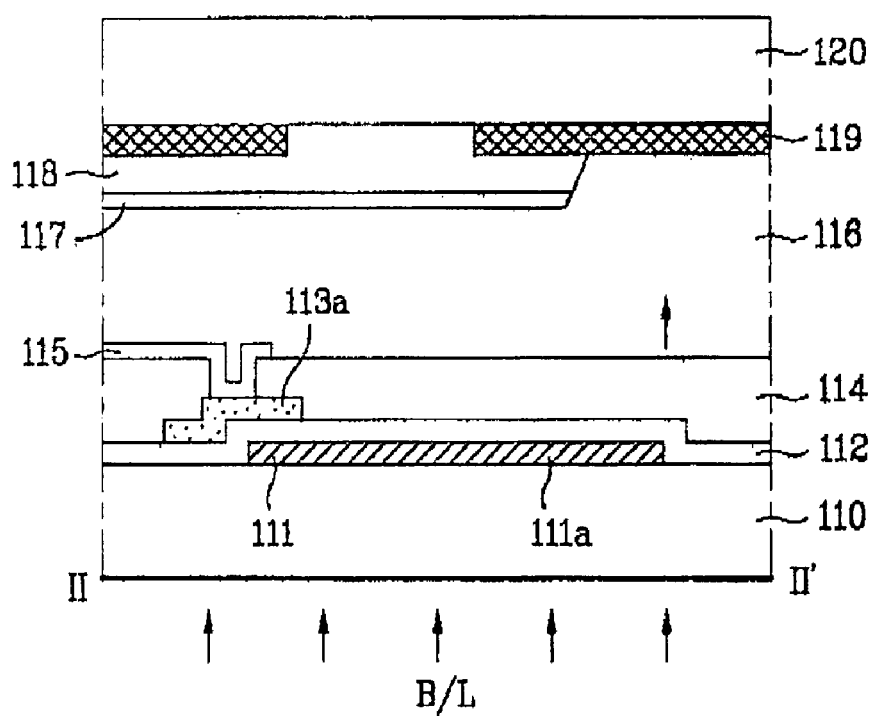
FIG. 4 is a sectional view of the LCD panel taken along line II–II' of FIG. 3.

Reference will now be made in detail to the preferred embodiments of the present invention, examples of which are illustrated in the accompanying drawings.
First Embodiment FIG. 3 is a plan view of an LCD panel according to the first embodiment of the present invention. FIG. 4 is a sectional view of the LCD panel taken along line II—II' of FIG. 3.

In the LCD panel according to the first embodiment of the present invention, a light leakage prevention film is specially formed simultaneously with a gate line in an array peripheral region of the panel, for preventing light leakage in the panel.

Referring to FIG. 3 and FIG. 4, the LCD panel according to the first embodiment of the present invention will be described in detail.

The LCD panel according to the first embodiment of the present invention includes first and second substrates 110 and 120. The first substrate 110 includes an array region, an array peripheral region, and a pad region. A plurality of gate lines 111 and a plurality of data lines 113 are formed in the array region of the first substrate 110 to define multiple pixel areas in a pixel region. These lines 111 and 113 are extended through the array peripheral region and connected with an external driving circuit in the pad region.

A light leakage prevention film 111a is formed simultaneously with the gate lines 111 in a dummy pattern, for preventing light leakage. The light leakage prevention film 111a extends from certain portions of each gate line 111 between the data lines 113 to cover areas where black matrixes are not formed. That is, the light leakage prevention film 111a is formed between the gate lines 111 and/or between the data lines 113 in the array peripheral region, and is made of a gate line material or an opaque conductive material to prevent light leakage in the panel.

A capacitor metal layer 113a is formed simultaneously with each data line 113, for forming a capacitor with the corresponding gate line 111. A TFT (partially shown) is formed at a crossing point of the corresponding gate line 111 and the corresponding data line 113. Then, a pixel electrode 115 is provided to electrically connect with each TFT.

The second substrate 120 is attached to the first substrate 110 to oppose the first substrate 110, and includes a black matrix 119, a color filter layer 118, and a common electrode 117. Then, a liquid crystal layer 116 having liquid crystal molecules is formed or injected between the first and second substrates 110 and 120.

The TFT generally includes a gate electrode, a semiconductor layer, and source/drain electrodes. The gate electrode extends from the gate line 111, and the semiconductor layer is insulated from the gate electrode above the gate electrode. The source/drain electrodes extend from the data line 113 and are formed on the semiconductor layer.

A method for manufacturing the LCD panel of FIG. 3 will be described in detail.

First, a metal layer is deposited on the entire surface of the first substrate 110 having the array region, the array peripheral region, and the pad region. Then, the first substrate 110 is patterned by photolithography or other techniques, thereby forming a plurality of gate lines 111 at certain intervals. In this process, a gate electrode extending from each gate line 111 is formed in each pixel region of the array region, and a light leakage prevention film 111a is formed at a predetermined portion of the array peripheral region for preventing light leakage in the panel. In a preferred embodiment, the light leakage prevention films 111a are formed simultaneously with the gate lines 111.

At this time, the light leakage prevention films 111a, formed in the array peripheral region where the data lines 113 are linked to each other, are arranged between the data lines 113, and extend from a $0^{th}$ gate line 111 as shown in FIG. 3. Meanwhile, the light leakage prevention films 111a, formed in the array peripheral region where the gate lines are linked, are formed between the gate lines 111, and are disconnected or separated from a $0^{th}$ data line, so that an electrical short is not created between the light leakage prevention films 111a and the data lines 113.

The $0^{th}$ data or gate line is formed along a border between the array region and the array peripheral region, in which a signal is primarily applied.

Each gate line 111 and/or the light leakage prevention films 111a are preferably formed of a metal having a high reflectivity such as Cr, Al, Sn, Cu, Mo, Cr/Mo, Cr/Al, or any combination thereof by using sputtering or other techniques.

Next, a gate insulating film 112 is formed on the first substrate 110 including the gate lines 111 and the gate electrodes. Then, the semiconductor layer as an active layer is formed on the gate insulating film 112 above the gate electrodes by using amorphous silicon(a-Si).

The gate insulating film 112 is preferably formed of a silicon nitride($SiN_x$) or a silicon oxide($SiO_x$) having a good interface characteristic with the amorphous silicon(a-Si), a good adhesion to the gate electrode 111, and a high internal insulating pressure.

Subsequently, a plurality of data lines 113 are formed on the gate insulating film 112 to cross the gate lines 111, for defining the unit pixel region.

The source/drain electrodes are formed simultaneously with the data lines 113 on the semiconductor layer. Then, a capacitor metal layer 113a is formed to overlap each gate line 111 to form a capacitor with the gate line 111.

A passivation film 114 is then formed on the entire surface of the first substrate 110 including the data line 113 by using Benzocyclobutane (BCB) or other material having a low dielectric rate.

The passivation film 114 is selectively patterned to form each pixel electrode 115 that is connected with the drain electrode.

A black matrix 119 is also formed at predetermined portions of the second substrate 120, for preventing certain light leakage and for improving a contrast ratio. A color filter layer 118 of R/G/B is formed between portions of the black matrix 119 to display color. Then a common electrode 117 is formed on the entire surface of the second substrate 120 including the color filter layer 118.

The pixel electrode 115 on the first substrate 110 and the common electrode 117 on the second substrate 120 are preferably formed by sputtering an indium tin oxide (ITO) that is mixed with an oxide tin or other transparent conductive material, at a ratio of about 5%.

A sealant is interposed along the circumference of the first substrate 110, and then a spacer is formed on the entire surface of the second substrate 120 to maintain a cell gap.

Then, the first and second substrates 110 and 120 are attached to each other, and the liquid crystal is injected between the first and second substrates 110 and 120.

Since the light leakage prevention films 111a are formed in a dummy pattern in the array peripheral region to prevent light leakage, even though the first and second substrates 110 and 120 are not precisely aligned to each other or a pattern of the liquid crystal is shifted, it is possible to prevent completely light from leaking between the gate and/or other lines in the array peripheral region. Further, since the light leakage prevention films 111a are formed to cover those areas corresponding to the black matrix 119 partially and those areas where the black matrix 19 is not formed, the present invention provides effectively a complete and thorough light leakage prevention mechanism.

As shown in FIG. 3, the gate line 111 connected with the light leakage prevention film 111a is the $0^{th}$ scanning (gate) line to which the gate signal is applied, which generally applies a low level voltage (Vgl).

A potential difference is constant between the Vgl of the first substrate and the common electrode of the second substrate, so that the liquid crystal is arranged on the light leakage prevention films 111a in a constant direction. Therefore, a distortion of the liquid crystal is prevented, thereby further eliminating or reducing light leakage in the panel. That is, the light leakage is further prevented from occurring on the light leakage prevention film 111a that is connected with the gate line.

Also, a process step for forming the light leakage prevention film 111a in the array peripheral region is not additionally required, so that the entire manufacturing process is not complicated and can be simplified.

Second Embodiment

Figure 5:
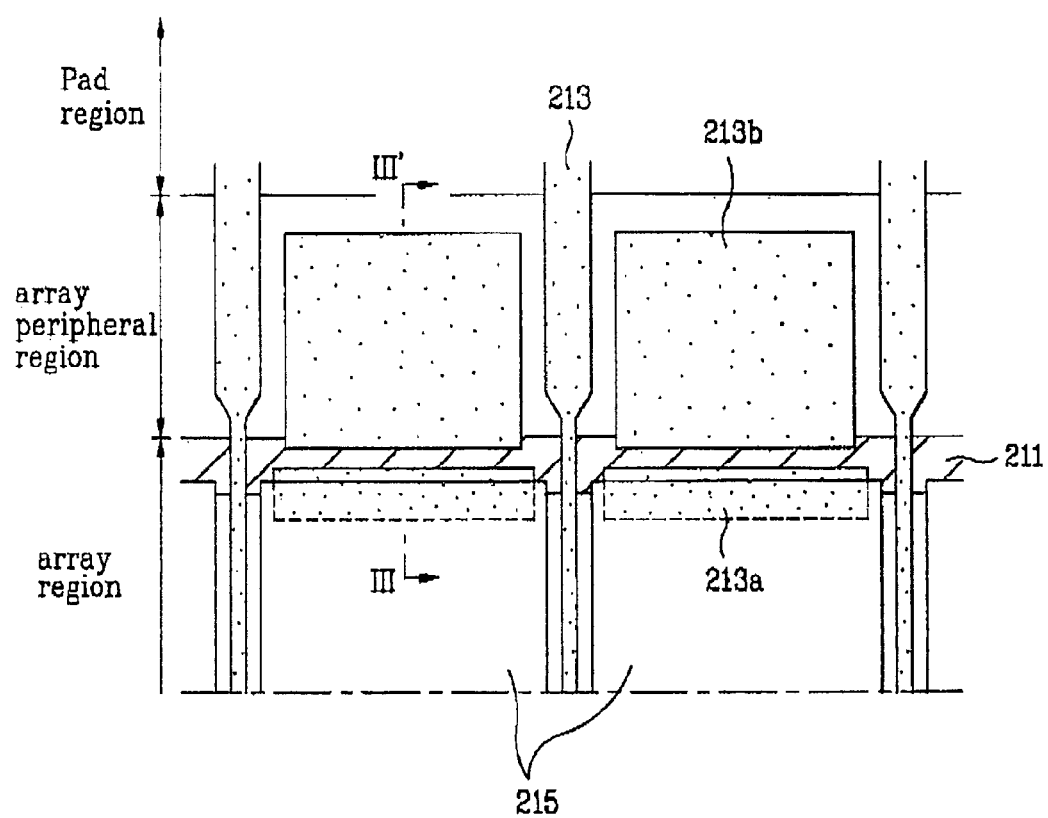
FIG. 5 is a plan view of an LCD panel according to a second embodiment of the present invention.
Figure 6:
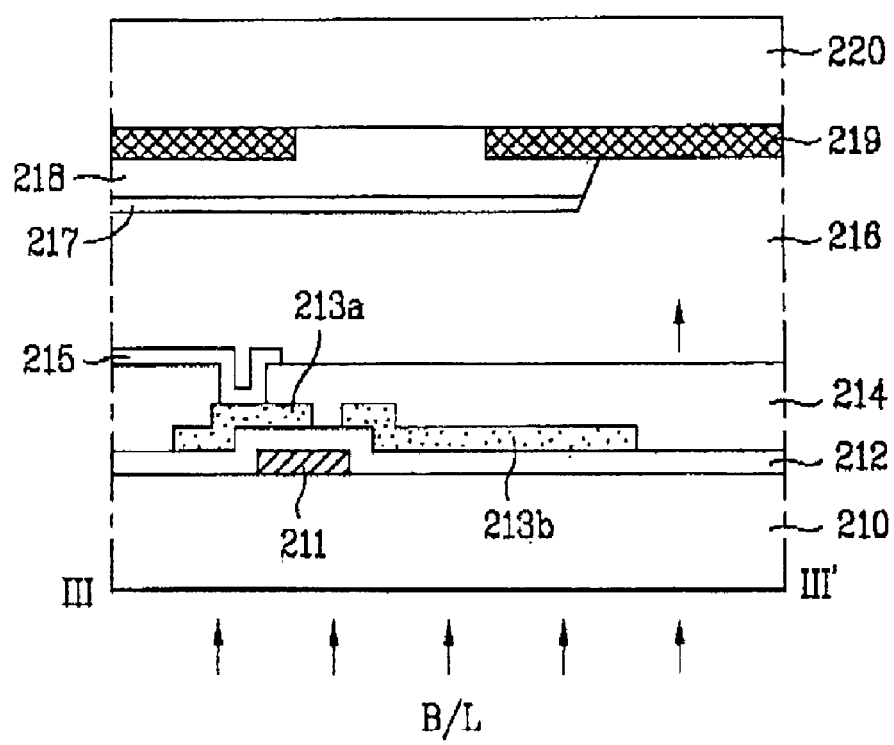
FIG. 6 is a plan view of the LCD panel taken along line III–III' of FIG. 5.

FIG. 5 is a sectional view of an LCD panel according to the second embodiment of the present invention. FIG. 6 is a sectional view of the LCD panel taken along line III—III' of FIG. 5.

In the LCD panel according to the second embodiment of the present invention, a light leakage prevention film is formed simultaneously with a data line in an array peripheral region, for preventing light leakage in the LCD panel.

Referring to FIG. 5 and FIG. 6, the LCD panel according to the second embodiment of the present invention includes first and second substrates 210 and 220. The first substrate 210 includes an array region, an array peripheral region, and a pad region. A plurality of gate lines 211 and a plurality of data lines 213 are formed in the array region of the first substrate 210 to define a pixel region, and are extended through the array peripheral region and connected with an external driving circuit or the like in the pad region.

A light leakage prevention film 213b is formed simultaneously with each data line 213 between the gate lines 211 or data lines 213 in the array peripheral region, for preventing light leaking in the LCD panel. A capacitor metal layer 213a is formed simultaneously with each data line 213 to partially overlap the gate line 211 to form a capacitor with the gate line 211.

Then, a TFT (partially shown) is formed at a crossing point of the corresponding gate line 211 and the corresponding data line 213 in each pixel region, and a pixel electrode 215 is formed to be electrically connected with the TFT. The TFT includes a gate electrode, a semiconductor layer, and source/drain electrodes as known in the art and discussed above in connection with the first embodiment.

The second substrate 220 is attached to the first substrate 210 to oppose the first substrate 210, and includes a black matrix 219, a color filter layer 218, and a common electrode 217. Then, a liquid crystal layer 216 having liquid crystal molecules is formed or injected between the first and second substrates 210 and 220.

A method for manufacturing the LCD panel of FIG. 5 will be described in detail.

A metal layer is deposited on the entire surface of the first substrate 210 having the array region, the array peripheral region, and the pad region. Then, a plurality of gate lines 211 are formed by using photolithography or other techniques, and gate electrodes are formed in the pixel region of the array region.

Subsequently, a gate insulating film 212 is formed on the entire surface of the first substrate 210 including the gate lines 211 and the gate electrodes. The gate insulating film 212 is preferable made of a silicon nitride($SiN_x$) or a silicon oxide($SiO_x$) having a high internal insulating pressure. Then, a semiconductor film made of an amorphous silicon(a-Si) is formed on the gate insulating film 212 above the corresponding gate electrode.

A metal layer is then deposited on the entire surface of the first substrate 210 including the semiconductor film. Then the data lines 213, source/drain electrodes, the capacitor metal layer 213a, and the light leakage prevention film 213b are formed thereon by using photolithography or other known techniques. Each data line 213 defines the unit pixel region by crossing the gate line 211, and the source/drain electrodes are respectively formed at both sides of the semiconductor film. The capacitor metal layer 213a partially overlaps the gate line 211, and the light leakage prevention film 213b is formed at a predetermined portion of the array peripheral region of the LCD panel. In a preferred embodiment, the light leakage prevention films 213b are formed simultaneously with the data lines 213 between the gate lines 211 and/or data lines 213.

At this time, the light leakage prevention films 213b, formed in the array peripheral region where the data lines 213 are linked to each other, are disconnected or separated from a $0^{th}$ gate line 211 as shown in FIG. 5, to prevent an electrical short with the gate lines 211. Meanwhile, the light leakage prevention films 213b, formed in the array peripheral region where the gate lines 211 are linked, are formed between the gate lines 211, and are connected with a $0^{th}$ data line 213.

The data lines 213, the source/drain electrodes, the capacitor metal layer 213a and/or the prevention film 213b are preferably formed of a metal having a high reflectivity, e.g., Cr, Al, Sn, Cu, Mo, Cr/Mo,Cr/Al, or any combination thereof.

A passivation film 214 is formed on the entire surface of the first substrate 210 including the data lines 213 by depositing Benzocyclobutane(BCB) or other suitable material of a predetermined depth.

Then, the passivation film 214 is selectively removed from predetermined portions to form each pixel electrode 215 that is connected with the drain electrode.

A black matrix 219 is formed at predetermined portions of the second substrate 220 to prevent certain light of the LCD panel from leaking and to improve a contrast ratio of the LCD panel. A color filter layer 218 of R/G/B is formed between portions of the black matrix 219 to display color, and then a common electrode 217 is formed on the entire surface of the second substrate 220 including the color filter layer 218.

The pixel electrodes 215 of the first substrate 210 and the common electrodes 217 of the second substrate 220 are preferably formed of an indium tin oxide (ITO) or other transparent conductive material by using sputtering or other known techniques.

A sealant is interposed along the circumference of the first substrate 210, and then a spacer is scatteredly formed on the entire surface of the second substrate 220 to maintain a cell gap.

Then, the first and second substrates 210 and 220 are aligned and attached to each other. Then the liquid crystal is formed or injected between the first and second substrates 210 and 220, thereby forming the LCD panel according to the present invention.

Since the light leakage prevention film 213b is formed between the gate and/or data lines in the array peripheral region as a dummy pattern using the metal having a high reflectivity, it is possible to prevent effectively any light from leaking between the gate and/or data lines in the array peripheral region.

In general, only a low level voltage (Vgl) is applied in the $0^{th}$ data line connected with the light leakage prevention film 213b. At this time, the liquid crystal is arranged in a constant direction due to a constant potential difference between the Vgl of the first substrate 210 and a voltage Vcom in the common electrode of the second substrate 220. That is, any distortion of the liquid crystal is prevented, so that the light leakage is further prevented or reduced.

Also, a process step for forming the light leakage prevention film 213b is not additionally required, so that the entire manufacturing process can be simplified.

In the embodiments of the present invention, the light leakage prevention films 111a and 213b are preferably formed with a conductive material capable of blocking light transmission. However, if the prevention films 111a and 213b are formed separate from the data and/or gate lines, then it may be possible to form them with a non-conductive material capable of blocking light transmission.

The method for manufacturing the LCD panel of the present invention has many advantages including the following.

First, the dummy pattern (e.g., light leakage prevention film) is additionally formed in the array peripheral region where light leakage occurs, so that any light leakage is effectively prevented from occurring, whereby the reliability and operation of the LCD panel is improved significantly.

Also, the light leakage prevention film is connected with the $0^{th}$ gate/data line adjacent to the array peripheral region, so that a distortion of the liquid crystal is prevented. This reinforces the light leakage prevention mechanism of the present invention.

Furthermore, a process step for forming the light leakage prevention film is not separately required since the prevention film is formed simultaneously with the gate or data lines, whereby light leakage is prevented without performing a complicated process step.

The forgoing embodiments are merely exemplary and are not to be construed as limiting the present invention. The present teachings can be readily applied to other types of apparatuses and/or systems. The description of the present invention is intended to be illustrative, and not to limit the scope of the claims. Many alternatives, modifications, and variations will be apparent to those skilled in the art.

What is claimed is:

1. A display panel including a first substrate having an array region and an array peripheral region, and a second substrate having a black matrix, the display panel comprising:

a plurality of gate lines on the first substrate;

a gate insulating film on the first substrate including said gate lines;

a plurality of data lines arranged to cross the gate lines, for defining a pixel region on the array region; and a light leakage prevention film comprised of a plurality of protruding portions of said gate lines, said protruding portions extending between said gate lines and/or data lines of the array peripheral region, for preventing light leakage, the array peripheral region excluding pixel electrodes.

2. The display panel as claimed in claim 1, further comprising:

a TFT and a pixel electrode formed in each pixel region located in the array region.

3. The display panel as claimed in claim 2, further comprising:

the second substrate having the black matrix and a color filter layer and facing the first substrate; and a liquid crystal layer formed between the first and second substrates.

4. The display panel as claimed in claim 1, further comprising:

a capacitor metal layer to partially overlap an upper portion of one of the gate lines.

5. The display panel as claimed in claim 1, wherein the light leakage prevention film is formed simultaneously with at least one of said gate lines.

6. The display panel as claimed in claim 5, wherein the light leakage prevention film is formed to prevent an electrical short with said data lines.

7. A method for manufacturing a display panel including a first substrate having an array region and an array peripheral region, and a second substrate having a black matrix, the method comprising the steps of:

forming a plurality of gate lines on the first substrate;

forming a gate insulating film on the first substrate including said gate lines;

forming a plurality of data lines to cross said gate lines and define a pixel region on the array region; and forming a light leakage prevention film comprised of a plurality of protruding portions of said gate lines, said protruding portions extending between said gate lines and/or the data lines of the array peripheral region to prevent light leakage, the array peripheral region excluding pixel electrodes.

8. The method according to claim 7, further comprising the steps of:

forming a TFT at a crossing point of a corresponding one of said gate lines and a corresponding one of said data lines;

forming a passivation film on the first substrate including the TFT; and forming, in the array region, a pixel electrode coupled with the TFT on the passivation film.

9. The method as claimed in claim 8, further comprising the steps of:

providing the second substrate having the black matrix and a color filter layer; and forming a liquid crystal layer between the first and second substrates.

10. The method as claimed in claim 7, wherein the light leakage prevention film is formed simultaneously with at least one of said gate lines to prevent light leakage in the display panel.

11. The method as claimed in claim 10, wherein the light leakage prevention film is formed of a conductive material having a high reflectivity.

12. The method as claimed in claim 10, wherein the light leakage prevention film is formed of any one of Cr, Al, Sn, Cu, Mo, Cr/Mo, Cr/Al, or a combination thereof.

13. The method as claimed in claim 10, wherein the light leakage prevention film is formed to prevent an electrical short with said data lines.

14. The method as claimed in claim 7, further comprising the step of:

forming a capacitor metal layer to partially overlap at least one of said gate lines.

* * * * *